US010122209B1

(12) United States Patent
Salama et al.

(10) Patent No.: US 10,122,209 B1
(45) Date of Patent: Nov. 6, 2018

(54) TUNABLE DELAY CONTROL OF A POWER DELIVERY NETWORK

(71) Applicant: Intel Corporation, Santa Clara, CA (US)

(72) Inventors: Ahmed Fouad Salama, Chandler, AZ (US); Srikrishnan Venkataraman, Bangalore (IN); Todd W. Mellinger, Fort Collins, CO (US); Michael J. Hill, Gilbert, AZ (US); Paul K. Tucker, Chandler, AZ (US); Assaf Benhamou, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/628,375

(22) Filed: Jun. 20, 2017

(51) Int. Cl.
| | |
|---|---|
| *G05F 1/00* | (2006.01) |
| *G05F 1/565* | (2006.01) |
| *H02J 13/00* | (2006.01) |
| *H02J 3/06* | (2006.01) |
| *B06B 1/02* | (2006.01) |
| *H02J 5/00* | (2016.01) |
| *H02J 50/80* | (2016.01) |
| *H04J 14/02* | (2006.01) |

(52) U.S. Cl.
CPC ........ *H02J 13/0075* (2013.01); *B06B 1/0207* (2013.01); *H02J 3/06* (2013.01); *H02J 5/005* (2013.01); *H02J 50/80* (2016.02); *H04J 14/02* (2013.01)

(58) Field of Classification Search
CPC ........ G05F 1/466; G05F 1/565; H02M 1/143; H02M 3/157
USPC ....... 323/266, 274, 275, 283–285, 289, 300, 323/303
See application file for complete search history.

(56) References Cited

U.S. PATENT DOCUMENTS

| | | | |
|---|---|---|---|
| 9,003,209 B2* | 4/2015 | Sizikov ..................... | G06F 1/26 323/283 |
| 2005/0140415 A1* | 6/2005 | Hazucha ............... | H02M 3/157 327/276 |
| 2016/0172966 A1* | 6/2016 | Kranz ..................... | H02M 3/04 323/234 |

* cited by examiner

Primary Examiner — Gary Nash
(74) Attorney, Agent, or Firm — Green, Howard, & Mughal LLP

(57) ABSTRACT

An apparatus system is provided which comprises: a first component to receive a first signal via a first delay circuit; a second component to receive a second signal via a second delay circuit; and one or more circuitries to tune a first delay of the first delay circuit and a second delay of the second delay circuit, based at least in part on monitoring of a voltage level.

20 Claims, 5 Drawing Sheets

TUNABLE DELAY CONTROL OF A POWER DELIVERY NETWORK

BACKGROUND

Modern state-of-the-art computing devices may operate at relatively high frequencies, and may have high power demands. However, in a power delivery network, power supply noise may increase with an increase in frequency and/or power demand. On the other hand, jitter and power delivery voltage specifications may become progressively tighter for higher performance. Thus, it may be desirable to reduce power supply noise.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
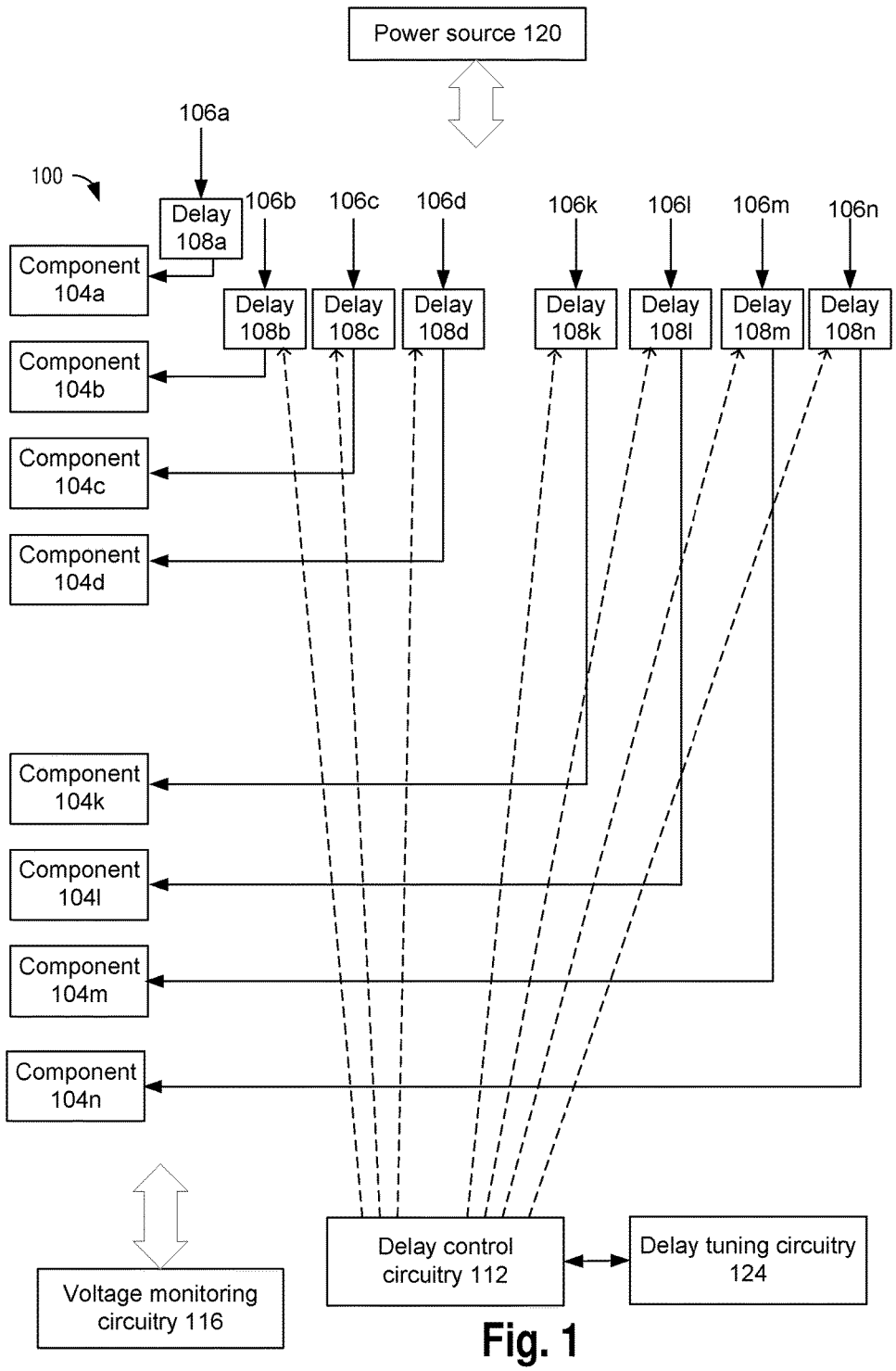
FIG. 1 illustrates a system comprising a plurality of components having staggered signal and/or power delivery using a plurality of delay circuits, according to some embodiments.

In some embodiments, a power supply and an associated power delivery network may supply power to a plurality of components of a computing device. If, for example, all or many of these components start to receive power at about the same time, there may be transient voltage drop in the output voltage of the power supply. Similarly, if all or many of these components stop receiving power at about the same time, there may be transient voltage overshoot in the output voltage of the power supply.

In order to avoid such transient voltage drop or voltage overshoot of the supply voltage, in some embodiments, signals to at least some of these components may be staggered or selectively delayed. For example, delay circuits may be introduced such that all the components may not load the power supply at the same time. Staggering the initialization or stopping of power delivery to multiple components, for example, may reduce such transient voltage drop or transient voltage overshoot, thereby reducing noise in the power supply voltage. In some embodiments, the delays on such delay circuits may be tunable. For example, the delays may be dynamically and automatically tuned to result in reduced noise in the power supply voltage. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 illustrates a system 100 comprising a plurality of components 104a, 104b, . . . , 104n having staggered signal and/or power delivery using a plurality of delay circuits 108a, 108b, . . . , 108n, according to some embodiments. In some embodiments, the components 104a, . . . , 104n may receive signals 106a, 106b, . . . , 106n, respectively, via the delay circuits 108a, 108b, . . . , 108n, respectively. For example, the component 104a may receive the signal 106a via the delay circuit 108a; the component 104b may receive the signal 106b via the delay circuit 108b, and so on, as illustrated in FIG. 1.

Elements referred to herein with a common reference label followed by a particular number or alphabet may be collectively referred to by the reference label alone. For example, components 104*a*, 104*b*, . . . , 104*n* may be collectively and generally referred to as components 104 in plural, and component 104 in singular. Similarly delay circuits 108*a*, 108*b*, . . . , 108*n* may be collectively and generally referred to as delay circuits 108 in plural, and delay circuit 108 in singular.

In some embodiments, the system 100 may be implemented in any appropriate computing device, e.g., a laptop, a smart phone, a desk top, a tablet, an Internet of Things (IoT), a set top box, a consumer electronic device, a cellular phone, or any other appropriate computing device.

The components 104*a*, 104*b*, . . . , 104*n* can be any appropriate components of a computing device. Merely as an example, a component 104 may be a processing core, a port, a lane of a port, an input/output interface, a lane of an input/output interface, components within a lane (e.g., such as a transmitter within a lane, a receiver within a lane, a phase locked loop (PLL) within a lane, etc.), and/or the like.

In some embodiments, the signals 106*a*, 106*b*, . . . , 106*n* may be any appropriate signals of a computing device. For example, a signal 106 may represent an input power, a data signal, a clock signal, etc.

In some embodiments, the system 100 may comprise a delay control circuitry 112 (henceforth also referred to as "circuitry 112"). The circuitry 112 may be configured to control a delay of individual ones of the delay circuits 108, where such a control is symbolically illustrated using dashed lines in FIG. 1. For example, the circuitry 112 may set the delay of each of the delay circuits 108.

In some embodiments, the system 100 may comprise a voltage monitoring circuitry 116 (henceforth also referred to as circuitry 116). The circuitry 116 may monitor voltage of, for example, the signals 106. In some embodiments, the signals 106 are power input signals from a power source 120, and the circuitry 116 may monitor a voltage level at an output of the power source 120 (or a voltage level of an associated power delivery network). For example, the circuitry 116 may monitor an output voltage of the power source 120. In some embodiments, the circuitry 116 may monitor one or more voltage levels of one or more components or circuitries of the system 100.

In some embodiments, the circuitry 116 may monitor the voltages internally (e.g., using elements that may be internal to the system 100), e.g., through software, graphical user interface (GUI), internal hardware circuitry, etc. In some embodiments, the circuitry 116 may monitor the voltages using, for example, an oscilloscope readout, where the oscilloscope may be external to the system 100.

In some embodiments, the system 100 may also comprise the power source 120. In an example, the power source 120 may supply power for one or more of the signals 106*a*, 106*b*, . . . , 106*n*.

In some embodiments, assuming that the delay circuits 108 are not present in the system 100 (or assuming a zero-delay imposed by the delay circuits 108), if the signals 106 are activated at substantially a same time, this may impose a sudden load to the power source 120 (e.g., impose a sudden load to a power delivery network supplying power to the signals 106). For example, the signals 106 may receive power from the same power source 120 over a power delivery network (not illustrated in FIG. 1). If the signals 106 are activated at substantially a same time (e.g., during a power up of the components 104, during an initialization of the system 100, etc.), this may lead to a transient voltage drop (also referred to as a voltage droop) in the output voltage of the power source 120 (or output voltages of the power delivery network). For example, in such a situation, a rate of change of current with time (e.g., di/dt) in the output of the power source 120 may be relatively high, thereby leading to the transient voltage drop. Such a transient voltage drop may introduce noise in the system voltage, and may not be desirable.

Similarly, assuming that the delay circuits 108 are not present in the system 100 (or assuming a zero-delay imposed by the delay circuits 108), if the signals 106 are deactivated at substantially a same time (e.g., during a power down of the components 104, during a shut-down of the system 100, etc.), the load of the power source 120 may decrease suddenly, thereby possibly leading to a transient overshoot in the output voltage of the power source 120. For example, in such a situation, a rate of change of current with time (e.g., di/dt) in the output of the power source 120 may be relatively high, thereby leading to the transient voltage overshoot. Such a transient voltage overshoot may introduce noise in the system voltage, and may also not be desirable.

In some embodiments, to avoid the above discussed transient voltage drop and/or transient voltage overshoot, the delay circuits 108 may introduce a delay in the signals 106. For example, the delay circuits 108 may ensure that the components 104 receive the signals 106 in a staggered manner (e.g., not receive the signals 106 at substantially the same time). Such staggering may distribute an initialization of termination of the loading of the components 104. Thus, the power source 120 may not be loaded suddenly at the same time (or the load of the power source 120 may not be terminated suddenly at the same time), thereby preventing or at least reducing such transient voltage drop and/or transient voltage overshoot.

For example, by introducing the programmed delay circuits 108, individual loads may be spaced uniformly in time to reduce an overlapping and alignment of the loads for the power source 120. Thus, for example, total effective load (instantaneous sum of all the individual component loads) imposed on the power source 120 and/or the associated power delivery network may be reduced substantially, thereby leading to a reduced noise in the system voltage, reduced transient voltage drop, and/or reduced transient voltage overshoot.

In some embodiments, a delay amount by which a delay circuit 108 is to delay a corresponding signal 106 may have to be determined. In some embodiments, such determination may be made during a design phase of the system 100 (e.g., by performing pre-silicon simulations). However, in some examples, such pre-silicon simulations (e.g., simulations before producing the actual system 100, by performing simulations of the design of the system 100) may be time consuming and may not be relatively accurate. For example, it may not always be all possible to simulate all possible scenarios of power delivery, and such simulations may miss a corner case. Additionally or alternatively, in some examples, since the simulation settings may be based on predictive and pre-silicon data, such simulation settings may not be as good or optimal as real silicon based settings.

Accordingly, in some embodiments, the actual system 100 (e.g., as opposed to a design of the system 100) may be tested iteratively to determine optimal or near optimal parameters of the delays of the delay circuits 108, as discussed in this disclosure. For example, the delays of the delay circuits 108 may be tuned, until satisfactory transient voltage performance of the system 100 may be achieved, as discussed in this disclosure. In some embodiments, the system 100 comprises a delay tuning circuitry 124 for dynamically and automatically tuning the delays of the delay circuits 108.

In FIG. 1, the delay circuits 108 are arranged in a specific manner. However, the delay circuits 108 may be arranged in any other appropriate manner, e.g., as illustrated in FIG. 2.

Figure 2:
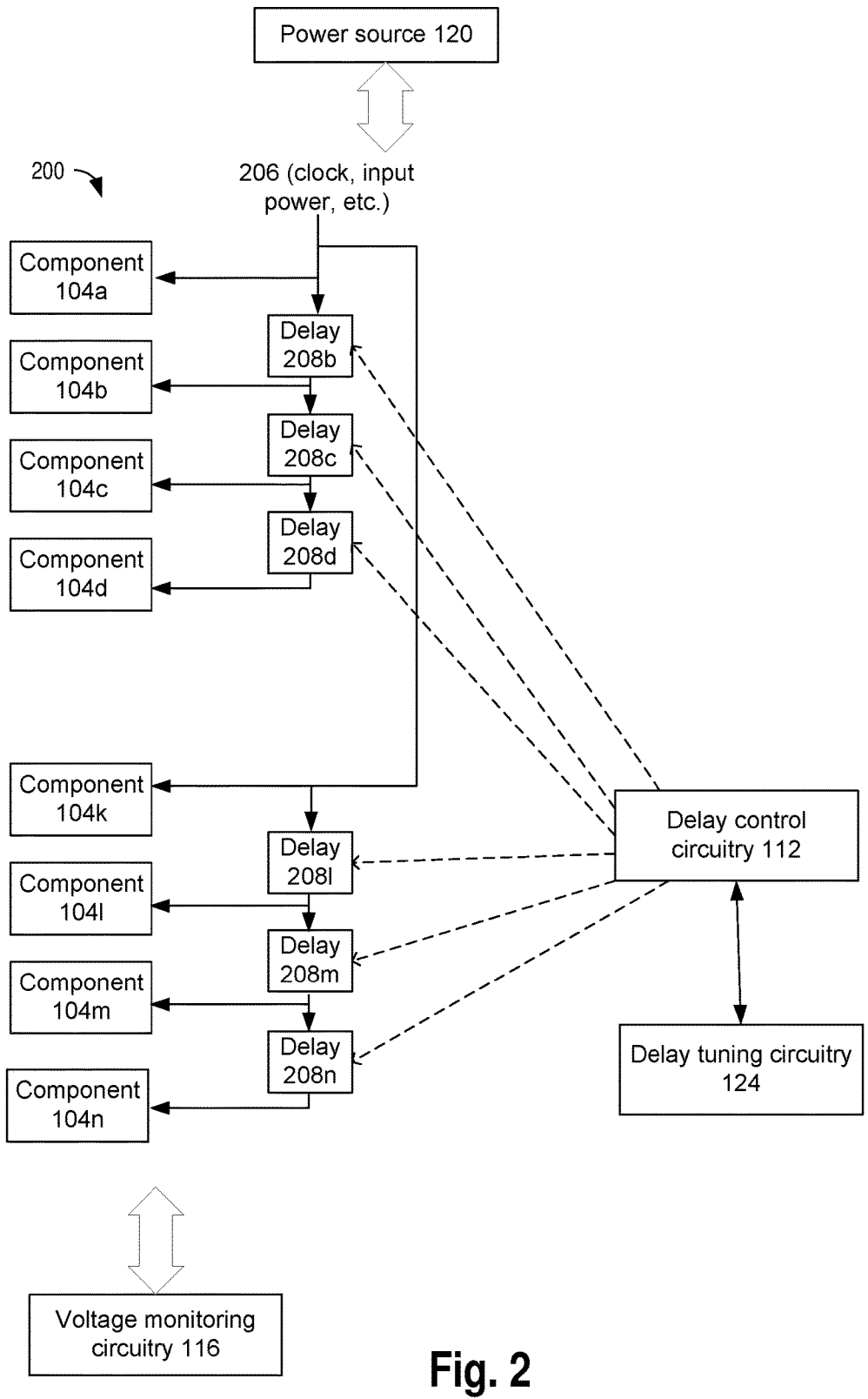
FIG. 2 illustrates another system comprising a plurality of components having staggered signal and/or power delivery using a plurality of delay circuits, according to some embodiments.

FIG. 2 illustrates a system 200 comprising a plurality of components 104a, 104b, . . . , 104n having staggered signal and/or power delivery using a plurality of delay circuits 208b, 208c, . . . , 208n, according to some embodiments. In the example of FIG. 2, a same signal 206 may be transmitted to the components 104, where the signal 206 may be input power to the components 104, a clock signal, or the like. Although the components 104 in FIG. 2 have been labeled using the same labels as the components 104 of FIG. 1 for purposes of simplicity, in some embodiments, the components 104 of FIG. 1 may be different from the corresponding components 104 of FIG. 2.

In some embodiments and merely as an example, the components 104 may be grouped in two groups—a first group comprising four components 104a, . . . , 104d, and a second group comprising four components 104k, . . . , 104n. Although each group comprises four components, such a number is merely an example.

In the first group, the component 104a may receive the signal 206 without any delay; the component 104b may receive the signal 206 via the delay circuit 208b; the component 104c may receive the signal 206 via the delay circuits 208b and 208c; and the component 104d may receive the signal 206 via the delay circuits 208b, 208c, and 208d. The second group may also be configured in a similar manner.

Merely as an example, the components of the first group may be lanes within a first input/output (I/O) port, and the components of the second group may be lanes within a second I/O port.

The delay imposed by the delay circuits 208 may be programmable by the circuitry 112. In some embodiments, as the delay of the delay circuits 208 gets added for at least some of the components 104, the delay imposed by the delay circuits 208 may be different from the delay imposed by the delay circuits 108.

In some embodiments, the system 200 comprises the delay tuning circuitry 124 for tuning the delays of the delay circuits 208. Operation of the systems 100 and 200 may be at least in part similar, and hence, the system 200 may not be explained in further details herein.

Figure 3:
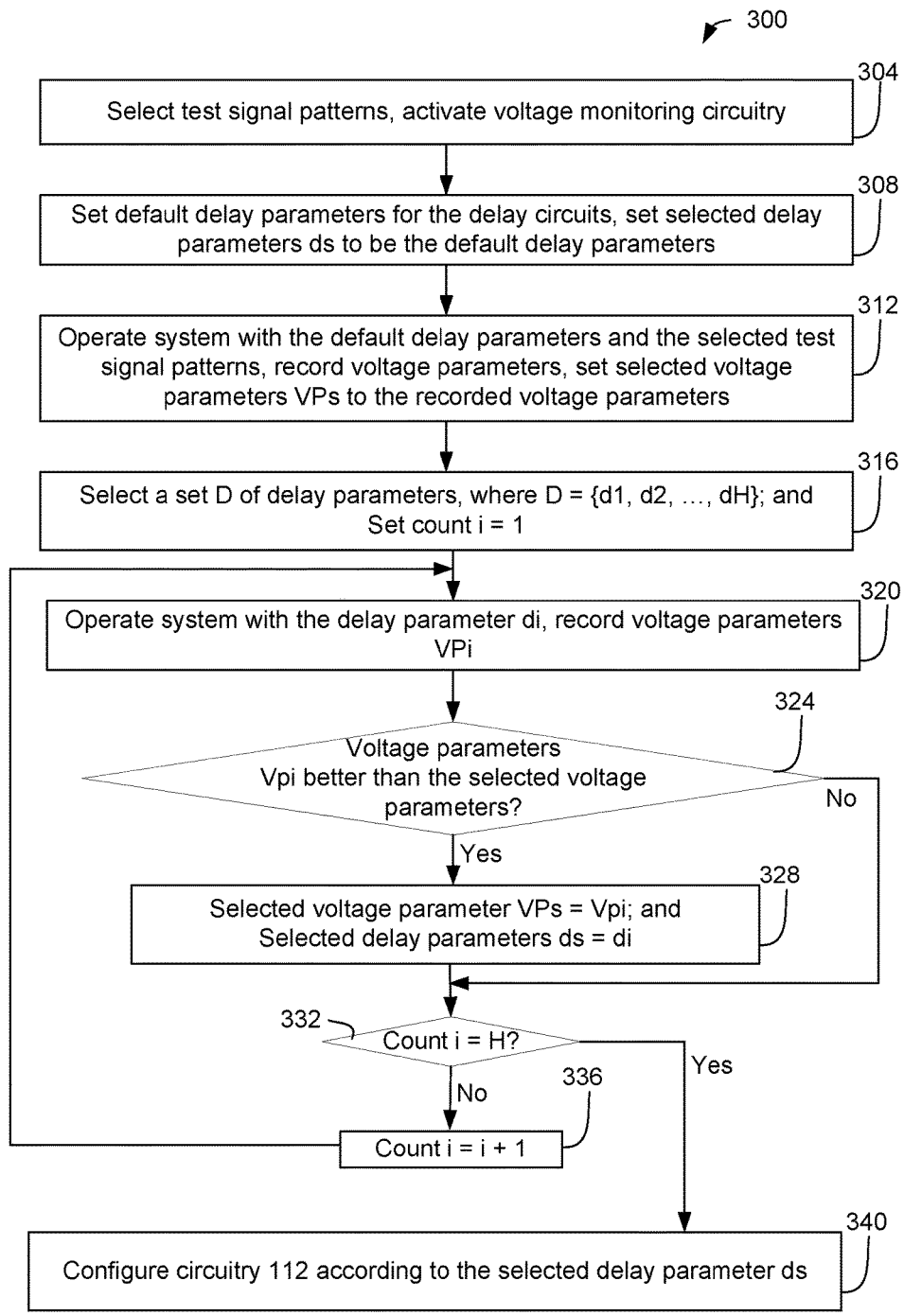
FIG. 3 illustrates a flowchart depicting a method for dynamically tuning delays of delay circuits to reduce power supply noise, according to some embodiments.

FIG. 3 illustrates a flowchart depicting a method 300 for dynamically tuning delays of delay circuits 108 of FIG. 1 (or delays of delay circuits 208 of FIG. 2) to reduce power supply noise, according to some embodiments. Although the blocks in the flowchart with reference to FIG. 3 are shown in a particular order, the order of the actions can be modified. Thus, the illustrated embodiments can be performed in a different order, and some actions/blocks may be performed in parallel. Some of the blocks and/or operations listed in FIG. 3 may be optional in accordance with certain embodiments. The numbering of the blocks presented is for the sake of clarity and is not intended to prescribe an order of operations in which the various blocks must occur.

In some embodiments, at 304 of the method 300, signal patterns for various components (e.g., components 104 of FIGS. 1 and/or 2) may be selected. For example, data signal patterns for the components 104 may be selected, which may load the components 104 (e.g., may artificially load the components 104). In some embodiments, the signal patterns may be selected for worst case situations (e.g., worst case power delivery network noise). For example, signal patterns that may produce large transient voltage drop and/or large transient voltage overshoot in the output voltage of the power source 120 may be selected.

In some embodiments, at 304, the circuitry 116 may also be activated to monitor voltages of the systems 100 and/or 200. As discussed previously, the circuitry 116 may measure voltages of the signals 106, 206, measure output voltage of the power source 120, voltage of a power delivery network associated with the power source 120, and/or the like. In some embodiments, the circuitry 116 may be activated to operate in a specific mode (e.g., a watermarking mode) in which the circuitry 116 may measure a maximum and/or a minimum value of the monitored voltages, a noise in the monitored voltages, and/or the like.

At 308, default delay parameters for the delay circuits 108 and/or 208 may be set by the circuitry 112. In some examples, the default delay parameters for the delay circuits 108 and/or 208 may be specified or obtained during a design and/or manufacturing of the systems 100 and/or 200. In some other examples, the default delay parameters may simply be zero. In yet some other examples, the default delay parameters may be randomly generated. In yet some other examples, the default delay parameters may be selected by a user of the systems 100 and/or 200. Also at 308, selected delay parameters "ds" may be set to be equal to the default delay parameters.

At 312, the system 100 and/or 200 may be operated with the default delay parameters, and various voltage parameters may be recorded (e.g., by the circuitry 116). In some embodiments, the voltage parameters may, for example, comprise variations in the output voltage of the power source 120. In some embodiments, the voltage parameters may comprise a lowest value of the output voltage of the power source 120 during a transient drop in the output voltage, e.g., as and when the components 104 are supplied the signals 106 or 206. For example, if the default delay parameters are all zero, then all the components 104 may receive the signals 106 or the signals 206 at about the same time, thereby leading to a relatively low value of the lowest of the output voltage of the power source. On the other hand, for non-zero default delay parameters, this parameter may have a relatively high value (e.g., as the transient voltage drop in the power source 120 may be less in this case due to the staggered initialization of power supply to the components 104, and the components 104 are loaded at different times).

In some embodiments, the voltage parameters may also comprise a highest voltage of the power source 120 during a possible transient voltage overshoot, e.g., when the signals 106 and/or 206 are deactivated.

In some embodiments, the voltage parameters may also comprise a measurement of noise in the voltage of the power source 120, e.g., due to a transient voltage drop and/or a transient voltage overshoot. The measurement of the noise, for example, may be a difference between a highest value and a lowest value of the output voltage of the power source 120, e.g., while the system is operated with the default delay parameters and the selected test patterns.

At 312, the recorded voltage parameters may be set as selected voltage parameters "VPs".

At 316, a set D of delay parameters may be selected (e.g., by the delay tuning circuitry 124), where D={d1, d2, . . . , dH}. Thus, for example, there may be H number of delay parameters in the set D, where H may be an appropriate positive integer, e.g., 2, 3, 4, or higher.

In some embodiments, candidate delay parameters d1 in the set D may represent example delays of the delay circuits 108 and/or 208. Merely as an example, the candidate delay parameters d1 may set a delay of the delay circuit 108a to be zero, a delay of the delay circuit 108b to be 1 picosecond (ps), a delay of the delay circuit 108c to be 2 ps, a delay of the delay circuit 108d to be 3 ps, a delay of the delay circuit 108k to be zero, a delay of the delay circuit 108l to be 1 ps, a delay of the delay circuit 108m to be 2 ps, and a delay of the delay circuit 108n to be 3 ps. It is to be noted that such delays may also be implemented in the system 200 by setting the delays of each of the delay circuits 208 to be 1 ps.

In another example, example candidate delay parameters d2 may set delays of the delay circuits 108a, 108b, ..., 108n to be 0 ps, 2 ps, 4 ps, 6 ps, 0 ps, 2 ps, 4 ps, and 6 ps, respectively. It is to be noted that such delays may also be implemented in the system 200 by setting the delays of each of the delay circuits 208 to be 2 ps.

In another example, example candidate delay parameters d7 may set delays of the delay circuits 108a, 108b, ..., 108n to be 0 ps, 1 ps, 3 ps, 4 ps, 7 ps, 8 ps, 9.5 ps, and 12 ps, respectively (e.g., set the delays in somewhat arbitrary or pseudorandom manner, and such delays may not be achieved in the system 200).

Various other candidate delay parameters in the set D may also be set in a similar manner. Merely as an example, the delays in the delay parameters in the set D may range from 1 ps to one or more microseconds, or even higher.

In some embodiments, for the example system 200, the delay in each of the delay circuits 208 may be set to a same value. Merely as an example, for the candidate delay parameters d1, the delay in each of the delay circuits 208 may be set to 1 ps; for the candidate delay parameters d2, the delay in each of the delay circuits 208 may be set to 2 ps; for the candidate delay parameters d3, the delay in each of the delay circuits 208 may be set to 3 ps; and so on.

Also, at 316, a count i may be initialized to one.

At 320, the system 100 and/or 200 may be operated with the delay parameters di, e.g., using the test signal patterns selected at 304. For example, during the first iteration of 320, the system may be operated with the delay parameters d1 (e.g., the delays of the delay circuits 108 or 208 may be set by the circuitry 112 in accordance with the delay parameters d1). In some embodiments, voltage parameters VPi (e.g., which may be voltage parameters VP1 for the first iteration of 320) may be recorded (e.g., by the circuitry 116). Examples of voltage parameters have been discussed with respect to block 312 of the method 300.

At 324, the voltage parameters VPi may be compared to the selected voltage parameters VPs, and it may be determined (e.g., by the delay tuning circuitry 124) whether the voltage parameters VPi are better than the selected voltage parameter VPs. For example, during the first iteration of the block 324, the selected voltage parameters VPs may be the voltage parameters set at block 312 of the method 300.

In some embodiments, one or more appropriate performance metrics may be used to determine whether the voltage parameters VPi are better than the selected voltage parameter VPs. For example, the voltage parameters VPi may comprise a lowest level of the output voltage of the power source 120 during a transient drop in the output voltage of the power source 116, e.g., as and when the components 104 are supplied the signals 106 or 206 and the delay parameters di are implemented. In another example, the voltage parameters VPi may comprise a highest level of the output voltage of the power source 120 during a transient overshoot in the output voltage, e.g., as and when the components 104 are supplied the signals 106 or 206 and the delay parameters di are implemented. In yet another example, the voltage parameters VPi may also comprise a measurement of noise in the voltage of the power source 120, e.g., due to a transient voltage drop and/or a transient voltage overshoot, as and when the components 104 are supplied the signals 106 or 206 and the delay parameters di are implemented.

In some embodiments, to determine the better voltage parameters, the lowest level of the output voltage of the power source 120 of the voltage parameters VPi may be compared to that of the selected voltage parameters VPs in block 324. In some other embodiments, to determine the better voltage parameters, the highest level of the output voltage of the power source 120 of the voltage parameters VPi may be compared to that of the selected voltage parameters VPs in block 324. In yet some other embodiments, to determine the better voltage parameters, the noise level of the output voltage of the power source 120 of the voltage parameters VPi may be compared to that of the selected voltage parameters VPs in block 324.

In some embodiments, a combination of one or more of the above discussed criteria may be used to select the better voltage parameters. For example, the voltage of the power source 116 may have an acceptable higher voltage level and/or an acceptable lower voltage level. In some embodiments, the voltage parameters VPi may be deemed better than the selected voltage parameters VPs if the lowest level of the output voltage of the power source 120 of the voltage parameters VPi may be higher than that of the selected voltage parameters VPs in block 324 (e.g., as long as the highest level of the output voltage of the power source 120 of the voltage parameters VPi is within the acceptable higher voltage level). In some embodiments, the voltage parameters VPi may be deemed better than the selected voltage parameters VPs if the noise level of the output voltage of the power source 120 of the voltage parameters VPi may be lower than that of the selected voltage parameters VPs in block 324 (e.g., as long as the lowest and highest levels of the output voltage of the power source 120 of the voltage parameters VPi are within the respective acceptable levels).

If "Yes" at 324, then at 328 the selected voltage parameter VPs may be updated to be now equal to the voltage parameter VPi, and the selected delay parameters ds may be updated to be now equal to the delay parameters di. Then the method 300 may proceed to 332. Also, if "No" at 324, the method may directly proceed to 332 (e.g., without updating the selected voltage parameters VPs and the selected delay parameters ds).

At 332, the current count may be compared to the number H, where H may be the number of candidate delay parameters in the set D. If "No" at 332 (e.g., if all the candidate delay parameters have been not considered yet), then the method 300 may proceed to 336, where the count i may be incremented, and the method 300 may loop back to block 320.

If "yes" at block 332 (e.g., if all the candidate delay parameters have been considered), then the method 300 may proceed to 340, where the final selected delay parameter ds may be deemed optimal or near optimal for the delays 108 or 208. Accordingly, the circuitry 112 may be configured (e.g., by the circuitry 124) with the final selected delay parameter ds, e.g., so that the circuitry 112 may set the delays of the delay circuits 108 and/or 208 in accordance with the selected delay parameter ds.

In some embodiments, a power delivery network associated with the power source 116 may have resonant frequencies that may create worst-case transient voltage drops (e.g., due to a large number of load components being loaded at around the same time). The method 300 may overcome such worst-case transient voltage drops, e.g., by adaptively tuning the delays 108 and/or 208, by reducing current spectral contents where the power delivery network impedance may peak, thereby improving the power supply noise.

In some embodiments, an accuracy of the tuning discussed in FIG. 3 may be improved by, for example, having finer granularity in the selected set of delay parameters D (e.g., by having a larger number of candidate delay parameters in the set D).

In some embodiments, the accuracy of the tuning in the method 300 may also be improved by selecting a large number of test signal patterns (which may be selected at 304 of method 300). For example, all possible test signal patterns (or at least a large number of test signal patterns) may be used for the method 300. This may lead to a relatively longer time to implement the method 300 (e.g., may take relatively longer time to implement the block 312 and 320), but such a large number of test signal patterns may include worst (or worse) cases on transient voltage drops or overshoots, thereby improving the tuning of the delays. For example, such a large number of test signal patterns may ensure that a large number of frequencies have been tested and any possible resonant frequency of the power delivery network have been identified.

In some embodiments, the method 300 may be performed for the system 100 and/or 200, and the selected delay parameter ds may be propagated to all similar systems. In some embodiments, the method 300 may be performed for the system 100 and/or 200 during a manufacturing, testing, and/or configuration of the system. In some embodiments, the method 300 may be performed for the system 100 and/or 200 during a boot up of the system, or may be performed at some intervals (e.g., may be repeated every few months, every year, whenever an excessive transient voltage drop or overshoot in the power source 116 is suspected, etc.).

Figure 4:
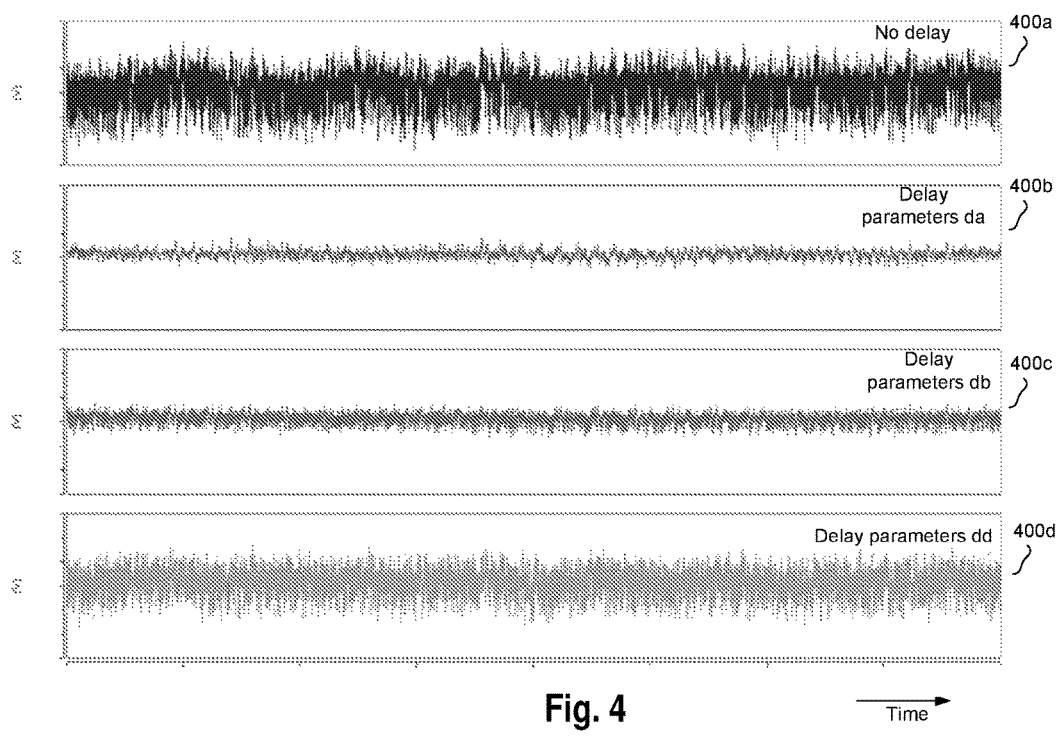
FIG. 4 illustrates graphs depicting effect of delay parameters on an output voltage of a power delivery network, according to some embodiments.

FIG. 4 illustrates graphs 400*a*, 400*b*, 400*c*, and 400*d* depicting effect of delay parameters on an output voltage of a power delivery network (e.g., output voltage of the power source 116), according to some embodiments. The X axis of these graphs represent time, and the Y axis of these graphs represent the output voltage of the power delivery network.

The graph 400*a* corresponds to a scenario where the delays of the delay circuits 108 or 208 are zero; the graph 400*b* corresponds to a scenario where first delay parameters db are implemented in the delay circuits 108 or 208; the graph 400*c* corresponds to a scenario where second delay parameters dc are implemented in the delay circuits 108 or 208; and the graph 400*d* corresponds to a scenario where third delay parameters dd are implemented in the delay circuits 108 or 208. The delay parameters db, dc and dd may be included in the set of delay parameters D of block 326 of the method 300.

As illustrated in FIG. 4, the noise in the voltage may be relatively high in the graphs 400*a* and 400*d*, and may be relatively low in the graphs 400*b* and 400*c*. For example, the noise in the voltage of the power source 120 may be the lowest in the graph 400*b*. For example, the lowest voltage level in the graph 400*b* may be higher than that in the graphs 400*a*, 400*c*, and 400*d*; and/or the highest voltage level in the graph 400*b* may be lower than that in the graphs 400*a*, 400*c*, and 400*d*. Accordingly, if the delay parameters db, dc and dd were included in the set of delay parameters D, the method 300 may output the delay parameters db as the selected delay parameters. The graphs 400*a*, . . . , 400*d* illustrate that tuning delay parameters (e.g., in accordance with the method 300) may yield better regulation and reduced noise in voltages of power delivery networks.

Figure 5:
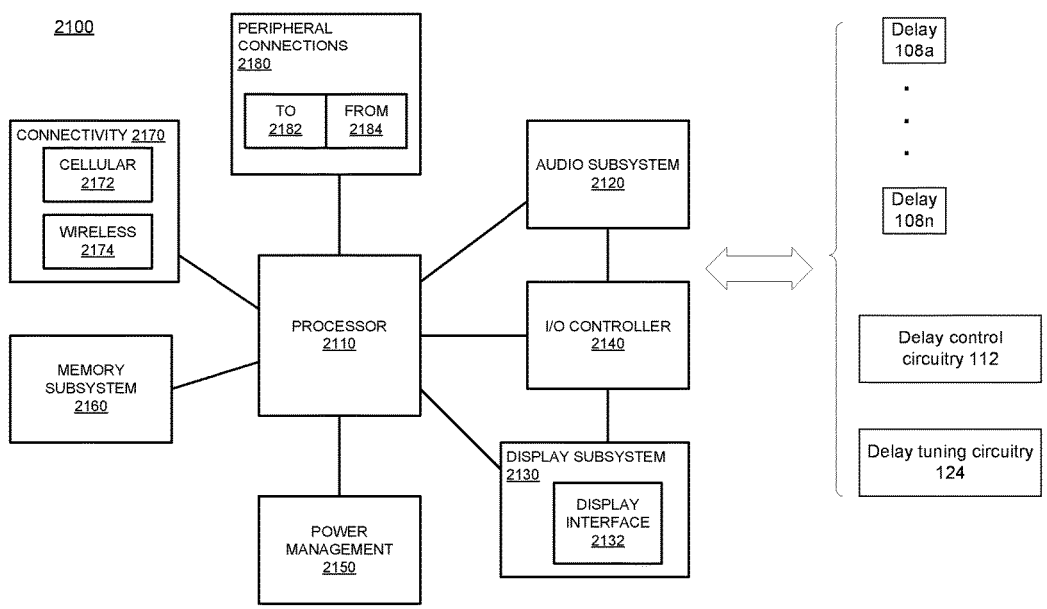
FIG. 5 illustrates a computer system or a SoC (System-on-Chip), where delays of delay circuits may be dynamically and automatically tuned to reduce power supply noise, according to some embodiments.

FIG. 5 illustrates a computer system or a SoC (System-on-Chip) 2100, where delays of delay circuits 108 (or delay circuits 208) may be dynamically and automatically tuned to reduce power supply noise, according to some embodiments. It is pointed out that those elements of FIG. 5 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise delay circuits 108 (or delay circuits 208). The delay circuits 108 may selectively delay data signals, input power, clock, and/or the like to corresponding appropriate components of the computing device 2100, e.g., as discussed with respect to FIGS. 1-2. In some embodiments, the computing device 2100 may comprise circuitry 112 and circuitry 124 to tune the delay parameters and/or set the delay parameters of the delay circuits, e.g., as discussed with respect to FIG. 3.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following example clauses pertain to further embodiments. Specifics in the example clauses may be used anywhere in one or more embodiments. All optional features of the apparatus described herein may also be implemented with respect to a method or process.

Clause 1.

An apparatus comprising: a first component to receive a first signal via a first delay circuit; a second component to receive a second signal via a second delay circuit; and one or more circuitries to tune a delay of the first delay circuit and a delay of the second delay circuit, based at least in part on monitoring of a voltage level.

Clause 2.

The apparatus of clause 1, wherein the one or more circuitries are first one or more circuitries, and wherein the apparatus further comprises: second one or more circuitries to monitor the voltage level of a power delivery network supplying power to the first component and the second component.

Clause 3.

The apparatus of clause 1, wherein the one or more circuitries are to: identify first delay parameters; identify second delay parameters; select one of the first delay parameters and the second delay parameters, based at least in part on monitoring of the voltage level; and tune the delay of the first delay circuit and the delay of the second delay circuit in accordance with the selected one of the first delay parameters and the second delay parameters.

Clause 4.

The apparatus of clause 3, wherein the one or more circuitries are first one or more circuitries, and wherein the apparatus further comprises: second one or more circuitries to: monitor a first variation of the voltage level while the first delay circuit and the second first delay circuit are to be operated in accordance with the first delay parameters, and monitor a second variation of the voltage level while the first delay circuit and the second first delay circuit are to be operated in accordance with the second delay parameters, wherein the first one or more circuitries are to select one of the first delay parameters and the second delay parameters, based at least in part on the first variation of the voltage level and the second variation of the voltage level.

Clause 5.

The apparatus of clause 4, wherein the first one or more circuitries are to: compare the first variation of the voltage level and the second variation of the voltage level to select one of the first variation of the voltage level and the second variation of the voltage level; and select one of the first delay parameters and the second delay parameters corresponding to a selected one of the first variation of the voltage level and the second variation of the voltage level.

Clause 6.

The apparatus of clause 5, wherein the first one or more circuitries are to: select the first variation of the voltage level based at least in part on: a lowest voltage of the first variation of the voltage level being higher than a lowest voltage of the second variation of the voltage level, and a highest voltage of the first variation of the voltage level being within an acceptable level.

Clause 7.

The apparatus of clause 5, wherein the first one or more circuitries are to: select the first variation of the voltage level based at least in part on a noise in the first variation of the voltage level being lower than a noise in the second variation of the voltage level.

Clause 8.

The apparatus of any of clauses 1-7, wherein: the first component is one or more of a first lane of an input/output port, a first transmitter within the first lane, a first receiver within the first lane, or a first phase locked loop (PLL) within the first lane; and the second component is one or more of a second lane of the input/output port, a second transmitter within the second lane, a second receiver within the second lane, or a second PLL within the second lane.

Clause 9.

The apparatus of any of clauses 1-7, further comprising: a plurality of components including the first component and the second component, wherein each component of the plurality of components is to receive a corresponding signal via a corresponding delay circuit of a plurality of delay circuits, and wherein the one or more circuitries are to tune a respective delay of a respective delay circuit of the plurality of delay circuits, based at least in part on monitoring of the voltage level.

Clause 10.

A system comprising: a memory to store instructions; a processor coupled to the memory; a first delay circuit; a second delay circuit; and one or more circuitries to: select one of first delay parameters and second delay parameters, and tune the first delay circuit and the second delay circuit in accordance with the selected delay parameters; and a wireless interface to allow the processor to communicate with another device.

Clause 11.

The system of clause 10, wherein the one or more circuitries are to select one of the first delay parameters and second delay parameters that reduces a noise in a voltage level.

Clause 12.

The system of any of clauses 10-11, further comprising: a first component to receive a first signal that bypasses each of the first delay circuit and the second delay circuit; a second component to receive a second signal via the first delay circuit; and a third component to receive a third via the second delay circuit.

Clause 13.

The system of clause 12, further comprising: a voltage monitoring circuitry to monitor a voltage level of a power delivery network supplying power to the first component, the second component, and the third component, wherein the one or more circuitries are to select one of first delay parameters and second delay parameters, based at least in part on monitoring of the voltage level.

Clause 14.

The system of clause 13, wherein: the voltage monitoring circuitry is to monitor a first variation of the voltage level of the power delivery network, in response to the first delay circuit and the second delay circuit being operated in accordance with the first delay parameters; the voltage monitoring circuitry is to monitor a second variation of the voltage level of the power delivery network, in response to the first delay circuit and the second delay circuit being operated in accordance with the second delay parameters; and the one or more circuitries are to select one of first delay parameters and second delay parameters, based at least in part on a comparison of the first variation of the voltage level and the second variation of the voltage level.

Clause 15.

The system of clause 12, wherein: the first component, the second component and the third component are three respective lanes of an input/output port.

Clause 16.

The system of clause 12, wherein: the first component is one or more of a first lane of an input/output port, a first transmitter within the first lane, a first receiver within the first lane, or a first phase locked loop (PLL) within the first lane; the second component is one or more of a second lane of the input/output port, a second transmitter within the second lane, a second receiver within the second lane, or a second PLL within the second lane; and the third component is one or more of a third lane of the input/output port, a third transmitter within the third lane, a third receiver within the third lane, or a third PLL within the third lane.

Clause 17.

The system of any of clauses 10-11, wherein: the first delay circuit and the second delay circuit are to reduce a transient voltage droop and/or to reduce a transient voltage overshoot in an output voltage of a power supply.

Clause 18.

One or more non-transitory computer-readable storage media configured to store instructions that, when executed by a processor included in an apparatus, cause the processor to perform operations comprising: identify first delay parameters; operate a plurality of delay circuits in accordance with the first delay parameters; identify second delay parameters; operate the plurality of delay circuits in accordance with the second delay parameters; select one of the first delay parameters and the second delay parameters, based at least in part on operating the plurality of delay circuits in accordance with the first and second delay parameters; and tune the plurality of delay circuits in accordance with the selected delay parameters.

Clause 19.

The one or more non-transitory computer-readable storage media of clause 18, wherein the instructions further cause the processor to perform operations comprising: monitor a voltage level while the plurality of delay circuits is operated in accordance with the first delay parameters; monitor the voltage level while the plurality of delay circuits is operated in accordance with the second delay parameters; and select one of the first delay parameters and the second delay parameters, based at least in part on monitoring the voltage levels.

Clause 20.

The one or more non-transitory computer-readable storage media of any of clauses 18-19, wherein the instructions further cause the processor to perform operations comprising: select one of the first delay parameters and the second delay parameters, to reduce noise in the voltage level.

Clause 21.

A method comprising: identifying first delay parameters; operating a plurality of delay circuits in accordance with the first delay parameters; identifying second delay parameters; operating the plurality of delay circuits in accordance with the second delay parameters; selecting one of the first delay parameters and the second delay parameters, based at least in part on operating the plurality of delay circuits in accordance with the first and second delay parameters; and tuning the plurality of delay circuits in accordance with the selected delay parameters.

Clause 22.

The method of clause 21, further comprising: monitoring a voltage level while the plurality of delay circuits is operated in accordance with the first delay parameters; monitoring the voltage level while the plurality of delay circuits is operated in accordance with the second delay parameters; and selecting one of the first delay parameters and the second delay parameters, based at least in part on monitoring the voltage levels.

Clause 23.

The method of clause 22, wherein selecting one of the first delay parameters and the second delay parameters further comprises: monitoring a first variation of the voltage level while the plurality of delay circuits is operated in accordance with the first delay parameters; monitoring a second variation of the voltage level while the plurality of delay circuits is operated in accordance with the second delay parameters; and selecting one of the first delay parameters and the second delay parameters, based at least in part on monitoring the first variation of the voltage level and the second variation of the voltage level.

Clause 24.

The method of clause 23, wherein selecting one of the first delay parameters and the second delay parameters further comprises: comparing the first variation of the voltage level and the second variation of the voltage level to select one of the first variation of the voltage level and the second variation of the voltage level; and selecting one of the first delay parameters and the second delay parameters corresponding to a selected one of the first variation of the voltage level and the second variation of the voltage level.

Clause 25.

The method of any of clauses 21-24, further comprising: selecting one of the first delay parameters and the second delay parameters, to reduce noise in the voltage level.

Clause 26.

One or more non-transitory computer-readable storage media to store instructions that, when executed by a processor, cause the processor to execute a method of any of the clauses 21-25.

Clause 27.

An apparatus comprising: means for performing the method of any of the clauses 21-25.

Clause 28.

An apparatus comprising: means for identifying first delay parameters; means for operating a plurality of delay circuits in accordance with the first delay parameters; means for identifying second delay parameters; means for operating the plurality of delay circuits in accordance with the second delay parameters; means for selecting one of the first delay parameters and the second delay parameters, based at least in part on operating the plurality of delay circuits in accordance with the first and second delay parameters; and means for tuning the plurality of delay circuits in accordance with the selected delay parameters.

Clause 29.

The apparatus of clause 28, further comprising: means for monitoring a voltage level while the plurality of delay circuits is operated in accordance with the first delay parameters; means for monitoring the voltage level while the plurality of delay circuits is operated in accordance with the second delay parameters; and means for selecting one of the first delay parameters and the second delay parameters, based at least in part on monitoring the voltage levels.

Clause 30.

The apparatus of clause 29, wherein the means for selecting one of the first delay parameters and the second delay parameters further comprises: means for monitoring a first variation of the voltage level while the plurality of delay circuits is operated in accordance with the first delay parameters; means for monitoring a second variation of the voltage level while the plurality of delay circuits is operated in accordance with the second delay parameters; and means for selecting one of the first delay parameters and the second delay parameters, based at least in part on monitoring the first variation of the voltage level and the second variation of the voltage level.

Clause 31.

The apparatus of clause 30, wherein the means for selecting one of the first delay parameters and the second delay parameters further comprises: means for comparing the first variation of the voltage level and the second variation of the voltage level to select one of the first variation of the voltage level and the second variation of the voltage level; and means for selecting one of the first delay parameters and the second delay parameters corresponding to a selected one of the first variation of the voltage level and the second variation of the voltage level.

Clause 32.

The apparatus of any of clauses 28-31, further comprising: means for selecting one of the first delay parameters and the second delay parameters, to reduce noise in the voltage level.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a first component to receive, from a source, a first signal via a first delay circuit;
   a second component to receive, from the source, a second signal via a second delay circuit;
   first one or more circuitries to monitor a voltage level of the source supplying the first signal and the second signal respectively to the first component and the second component; and
   second one or more circuitries to tune a delay of the first delay circuit and a delay of the second delay circuit, based at least in part on the first one or more circuitries monitoring the voltage level of the source.

2. The apparatus of claim 1, wherein:
   the source is a power delivery network; and
   the first and second signals are first power and second power, respectively, supplied from the power delivery network to the first and second components, respectively, via the first and second delay circuits.

3. The apparatus of claim 1, wherein the second one or more circuitries are to:
   identify first delay parameters;
   identify second delay parameters;
   select one of the first delay parameters and the second delay parameters, based at least in part on first one or more circuitries monitoring the voltage level; and
   tune the delay of the first delay circuit and the delay of the second delay circuit in accordance with the selected one of the first delay parameters and the second delay parameters.

4. The apparatus of claim 3, wherein the first one or more circuitries are to:
   monitor a first variation of the voltage level while the first delay circuit and the second first delay circuit are to be operated in accordance with the first delay parameters, and
   monitor a second variation of the voltage level while the first delay circuit and the second first delay circuit are to be operated in accordance with the second delay parameters, and
   wherein the second one or more circuitries are to select one of the first delay parameters and the second delay parameters, based at least in part on the first variation of the voltage level and the second variation of the voltage level.

5. The apparatus of claim 4, wherein the second one or more circuitries are to:
   compare the first variation of the voltage level and the second variation of the voltage level to select one of the first variation of the voltage level and the second variation of the voltage level; and
   select one of the first delay parameters and the second delay parameters corresponding to a selected one of the first variation of the voltage level and the second variation of the voltage level.

6. The apparatus of claim 5, wherein the second one or more circuitries are to:
   select the first variation of the voltage level based at least in part on:
   a lowest voltage of the first variation of the voltage level being higher than a lowest voltage of the second variation of the voltage level, and
   a highest voltage of the first variation of the voltage level being within an acceptable level.

7. The apparatus of claim 5, wherein the second one or more circuitries are to:
   select the first variation of the voltage level based at least in part on a noise in the first variation of the voltage level being lower than a noise in the second variation of the voltage level.

8. The apparatus of claim 1, wherein:
   the first component is one or more of a first lane of an input/output port, a first transmitter within the first lane, a first receiver within the first lane, or a first phase locked loop (PLL) within the first lane; and
   the second component is one or more of a second lane of the input/output port, a second transmitter within the second lane, a second receiver within the second lane, or a second PLL within the second lane.

9. The apparatus of claim 1, further comprising:
   a plurality of components including the first component and the second component,
   wherein each component of the plurality of components is to receive a corresponding signal via a corresponding delay circuit of a plurality of delay circuits, and wherein the one or more circuitries are to tune a respective delay of a respective delay circuit of the plurality of delay circuits, based at least in part on monitoring of the voltage level.

10. A system comprising:
a memory to store instructions;
a processor coupled to the memory;
a first delay circuit to supply power from a power source to a first component after a first delay;
a second delay circuit to supply power from the power source to a second component after a second delay; and
one or more circuitries to:
  select one of first delay parameters and second delay parameters, and
  tune the first delay circuit and the second delay circuit in accordance with the selected delay parameters; and
a wireless interface to allow the processor to communicate with another device.

11. The system of claim 10, wherein the one or more circuitries are to select one of the first delay parameters and second delay parameters that reduces a noise in a voltage level.

12. The system of claim 10, further comprising:
a third component to receive power that bypasses each of the first delay circuit and the second delay circuit;
the first component to receive power via the first delay circuit; and
the second component to receive power via the second delay circuit.

13. The system of claim 12, further comprising:
a voltage monitoring circuitry to monitor a voltage level of the power source supplying power to the first component, the second component, and the third component,
wherein the one or more circuitries are to select one of first delay parameters and second delay parameters, based at least in part on monitoring of the voltage level.

14. The system of claim 13, wherein:
the voltage monitoring circuitry is to monitor a first variation of the voltage level of the power source, in response to the first delay circuit and the second delay circuit being operated in accordance with the first delay parameters;
the voltage monitoring circuitry is to monitor a second variation of the voltage level of the power source, in response to the first delay circuit and the second delay circuit being operated in accordance with the second delay parameters; and
the one or more circuitries are to select one of first delay parameters and second delay parameters, based at least in part on a comparison of the first variation of the voltage level and the second variation of the voltage level.

15. The system of claim 12, wherein:
the first component, the second component and the third component are three respective lanes of an input/output port.

16. The system of claim 12, wherein:
the first component is one or more of a first lane of an input/output port, a first transmitter within the first lane, a first receiver within the first lane, or a first phase locked loop (PLL) within the first lane;
the second component is one or more of a second lane of the input/output port, a second transmitter within the second lane, a second receiver within the second lane, or a second PLL within the second lane; and
the third component is one or more of a third lane of the input/output port, a third transmitter within the third lane, a third receiver within the third lane, or a third PLL within the third lane.

17. The system of claim 10, wherein:
the first delay circuit and the second delay circuit are to reduce a transient voltage droop and/or to reduce a transient voltage overshoot in an output voltage of the power source.

18. One or more non-transitory computer-readable storage media configured to store instructions that, when executed by a processor included in an apparatus, cause the processor to perform operations comprising:
identify first delay parameters;
operate a plurality of delay circuits in accordance with the first delay parameters;
monitor a first variation of a voltage level while the plurality of delay circuits are operated in accordance with the first delay parameters;
identify second delay parameters;
operate the plurality of delay circuits in accordance with the second delay parameters;
monitor a second variation of the voltage level while the plurality of delay circuits are operated in accordance with the second delay parameters;
select one of the first delay parameters and the second delay parameters, based at least in part on the first variation of the voltage level and the second variation of the voltage level; and
tune the plurality of delay circuits in accordance with the selected delay parameters.

19. The one or more non-transitory computer-readable storage media of claim 18, wherein variations of voltage level of a power delivery network are monitored, and wherein the power delivery network is to supply power to a plurality of components respectively via the plurality of delay circuits.

20. The one or more non-transitory computer-readable storage media of claim 18, wherein the instructions further cause the processor to perform operations comprising:
select one of the first delay parameters and the second delay parameters, to reduce noise in the voltage level.

* * * * *